United States Patent [19]

Teller et al.

[11] 3,879,384
[45] Apr. 22, 1975

[54] 7-[2-(1-AND 2 CYCLOPENTEN-1-YL)ACETAMIDO]CEPH-ALOSPORANIC ACIDS

[75] Inventors: Daniel M. Teller, Devon; John H. Sellstedt, King of Prussia, both of Pa.

[73] Assignee: American Home Products Corporation, New York, N.Y.

[22] Filed: Apr. 16, 1973

[21] Appl. No.: 351,746

[52] U.S. Cl............................. 260/243 C; 424/246
[51] Int. Cl.................................... C07d 99/24
[58] Field of Search ..................... 260/243 C

[56] References Cited
UNITED STATES PATENTS
3,704,297  11/1972  Dvonuh et al. ............... 260/243 C Primary Examiner—Nicholas S. Rizzo
Attorney, Agent, or Firm—Stephen Venetianer

[57] ABSTRACT

This invention is directed to novel cephalosporin compounds represented by the following structural formula:

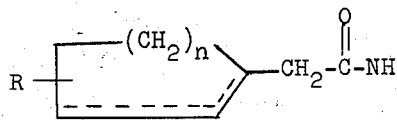

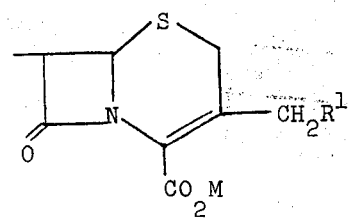

wherein R, $R^1$, M and $n$ are defined herein. These compounds have been found to have useful antibacterial properties.

7 Claims, No Drawings

7-[2-(1-AND 2-CYCLOPENTEN-1-YL)ACETAMIDO]CEPHALOSPORANIC ACIDS

BACKGROUND OF THE INVENTION

1. Field of the Invention

This invention relates to derivatives of 7-amino cephalosporanic acid (7-ACA). More particularly, this invention relates to 7-[2-(1-and 2-cycloalken-1-yl)acetamido]cephalosporanic acids.

2. Description of the Prior Art

U.S. Pat. No. 2,562,407 describes the microbiological preparation of the amides of 6-aminopenicillanic acid with cyclopentene and cyclohexene acetic acids.

SUMMARY OF THE INVENTION

This invention relates to the following novel derivatives of 7ACA represented by the following structural formula:

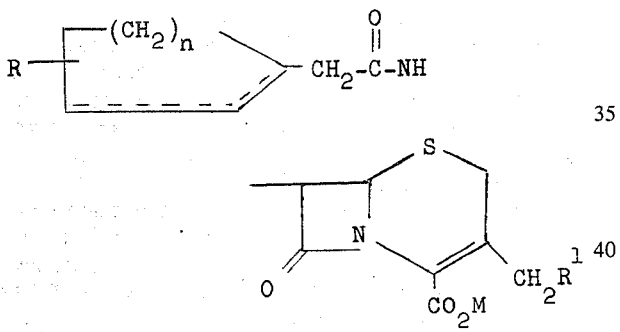

wherein R is hydrogen or lower alkyl; $n$ is an integer from 1 to 4; and $R^1$ is hydrogen, acetoxy, a quaternary ammonium cation or sulfur wherein the sulfur atom is attached to a heterocyclic nucleus and M is hydrogen, a pharmaceutically acceptable cation or an anionic charge when $R^1$ is a quaternary ammonium radical. As used herein the above formula is a generic formula which embraces compounds of the following formulae:

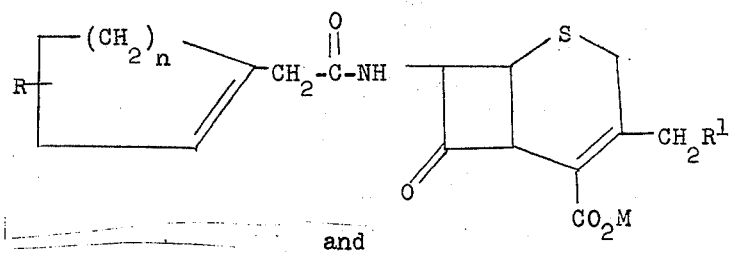

and

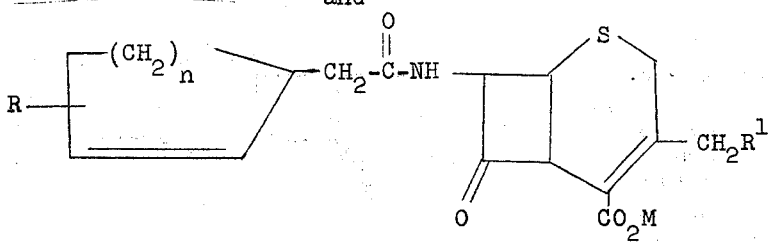

wherein R, $R^1$, M and $n$ are as previously indicated.

DESCRIPTION OF THE INVENTION

As used herein the term "(lower) alkyl" means a straight or branched chain hydrocarbon radical having $C_1$–$C_6$ carbon atoms. Illustrative of (lower)alkyl is methyl, ethyl, isopropyl, butyl, sec-butyl, and hexyl. Illustrative of the term "heterocyclic nucleus" is imidazolyl, imidazolinyl, oxazolyl, oxazolinyl, thiazolyl, thiazolinyl, 1,2,4-triazolyl, 1,3,4-dithiazolyl, 1,2,4-thiadiazolyl, pyrimidyl, 1,2,4-triazinyl, 1,3,5-triazinyl, 1,3-thiazinyl, 1,3,4-thiadiazinyl, 1,3,5-thiadiazinyl, 1,3,4-oxadiazinyl, 1,3,5-dioxazinyl. The term "quaternary ammonium cation" is exemplified by pyridinyl.

The preferred cephalosporins of the present invention have the following structural formula:

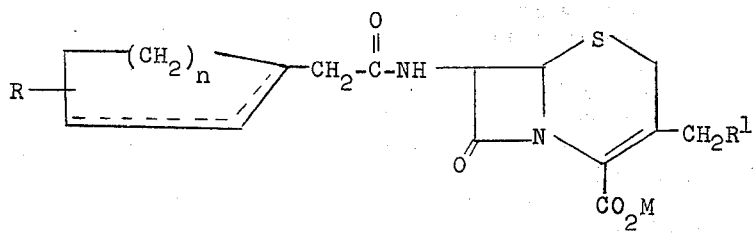

wherein R is hydrogen, $R^1$ is acetoxy, M is hydrogen or a pharmaceutically acceptable salt and $n$ is one or two.

The compounds of this invention can be prepared in the following manner:

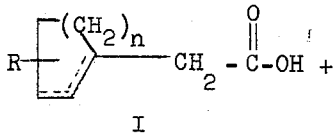

I

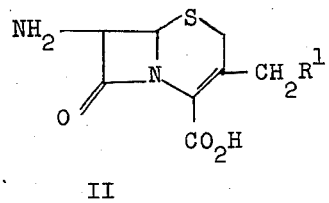

II

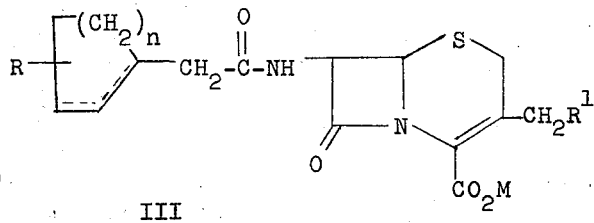

III where R, R¹, M and *n* are described as above. The condensing agent can be any well-known compound used for this purpose. Illustrative of preferred condensing agents are carbonyl diimidazole, dicyclohexyl carbodiimide and isobutyl chloroformate.

Alternately, compounds represented by formula III may be prepared by reacting the acid chloride of formula I with a 7-ACA derivative in an anhydrous medium or in water. Additionally, the acid chloride may be used to acylate a silylated 7-ACA or a phosphorylated 7-ACA derivative, followed by hydrolysis in order to form compounds of Formula III.

As will be understood by those skilled in the art, the compounds of Formula III may be utilized in their acid form or in the form of the therapeutically-active salts thereof, e.g., the sodium or potassium salts etc., or in the form of the pharmaceutically acceptable acid addition salts prepared by the reaction of the cephalosporin compounds with an amine or diamine base, e.g., procaine or various N-N'-disubstituted alkylene diamines, such as N,N'-dibenzylethylenediamine, etc.

The new compounds of the series defined above show desirable broad spectrum anti-bacterial activity and are useful as therapeutic agents for poultry and mammals in the treatment of infectious diseases caused by gram-positive and gram-negative bacteria by either parenteral or oral administration, particularly strains of *Staphylococcus aureus, E. Coli,* and Proteus.

As will be also be understood by those skilled in the art, the compounds of the invention may be utilized in suitable dosage forms, including solutions, suspensions, tablets, capsules, and the like.

The following examples are illustrative of the invention.

EXAMPLE 1

7-[2-(1-Cyclopenten-1-yl)acetamido]cephalosporanic acid

To a solution of 1-cyclopenteneacetic acid (0.64 g, 0.005 mole) in dry tetrahydrofuran (20 ml) containing triethylamine (0.70 ml) at −10°C under nitrogen is added all at once isobutyl chloroformate (0.65 ml, 0.01 moles). A colorless precipitate is formed at once and the mixture is stirred at −10°C for 10 minutes. A solution of 7-ACA (1.36 g, 0.005 moles) and triethylamine (0.70 ml) in water/tetrahydrofuran (1:1, 20 ml) is added all at once and the mixture is stirred at 5° 1 hour and 25° 1 hour. The tetrahydrofuran is evaporated in vacuo <40°. A solution of 60 ml of water and 20 ml of ethyl acetate is added, the mixture shaken thoroughly and the organic layer discarded. The aqueous layer is cooled to 5°, 60 ml of ethyl acetate are added and the mixture acidified to pH 2.9 with 10% aqueous hydrochloric acid. The organic layer is separated, and the aqueous layer is extracted with 40 ml of ethyl acetate. The combined extract and organic layer are washed with water, brine and dried over anhydrous sodium sulfate. Evaporation in vacuo <40° leaves a glass, mp. 148°–153° (d); $\lambda_{max}^{KBr}$ 5.60; 6.10 $\mu$; NMR has 2.05 ppm peak.

EXAMPLE 2

7-[2-(2-Cyclopenten-1-yl)acetamido]cephalosporanic acid potassium salt

To a solution of 2-cyclopentenacetic acid (0.32 g, 0.0025 moles) in dry dimethylformamide (4.0 ml) at room temperature is added carbonyl diimidazole (0.41 g, 0.0025 moles) under nitrogen. Carbon dioxide evolution begins immediately. After 30 minutes at room temperature the residual carbon dioxide is removed under vacuum, the mixture cooled to −10°C and a solution of 7-ACA (0.68 g, 0.0025 moles) in dry methylene chloride (10 ml) containing triethylamine (1.04 ml) is added all at once. After stirring 2 hours at room temperature n-butanol (2.5 ml) is added, then potassium ethyl hexanoate (1.25 ml of a 2 M solution in n-butanol). After stirring 10 minutes, ethyl ether (100 ml) is added, the product filtered and dried in vacuo at room temperature to yield a tan solid, mp. 180°–280° (d); $\lambda_{max}^{KBr}$ 5.70, 6.22 $\mu$; NMR has a sharp singlet at 2.10 ppm.

EXAMPLE 3

7-[2-(1-Cyclohexen-1-yl)acetamido]cephalosporanic acid

Using the procedure described in Example 1 but substituting 1-cyclohexene acetic acid for 2-cyclopentene acetic yields the title compound.

EXAMPLE 4

7-[2-(2-Cyclohexen-1-yl)acetamido]cephalosporanic acid potassium salt

Using the procedure described in Example 2 but substituting 2-cyclohexene acetic acid for 2-cyclopentene acetic acid yields the title compound.

The compounds of formula III of this invention have been found to possess antibacterial activity. Antibacterial screening is carried out by an agar serial dilution technique. Distilled water is used as a vehicle. The stock solution is prepared at 10,000μg./ml. of substance in the vehicle. Two-fold dilutions are made with sterile water. One ml. quantities of each dilution are incorporated into 9 ml. seed agar in sterile Petri dishes. The hardened surface is inoculated with test organisms and incubated 18 hours at 35°C. The end point is reported as a minimal inhibitory concentration (MIC) expressed in $\mu$g./ml.; the least amount of test substance that will completely inhibit the test organism. The compound of Example 1 when tested against *Staphylococcus aureus* Smith produced a MIC value of 0.122 $\mu$g./ml. and when tested against *Bacillus subtillus* produced a MIC value of 0.061 $\mu$g./ml. When tested against *Staphylcoccus aureus* 6538P the compound of Example 1 produced a MIC value of 0.244 $\mu$g./ml. The compound of Example 2 produced the following MIC values against the listed bacteria:

|  | MIC Value |
|---|---|
| 1. *Staphylcoccus aureus* SMITH | 1.95 |
| 2. *Staphylococcus aureus* 6538P | 3.90 |
| 3. *Bacillus subtillus* | .976 |

What is claimed is:

1. Compounds represented by the formula:

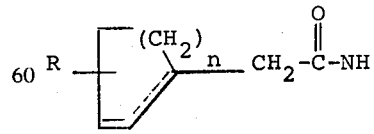
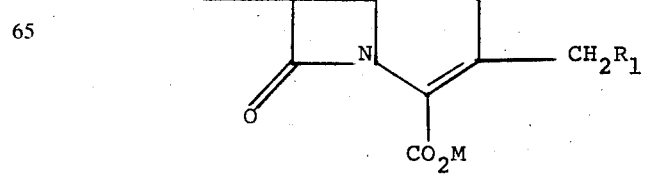

Wherein R is hydrogen or lower alkyl, $n$ is one, $R^1$ is selected from the group consisting of hydrogen, acetoxy and pyridinium and M is selected from the group consisting of hydrogen and a pharmaceutically acceptable cation.

2. A compound according to claim 1 wherein R is methyl.

3. A compound according to claim 1 wherein $R^1$ is hydrogen.

4. A compound according to claim 1 wherein $R^1$ is acetoxy.

5. A compound according to claim 1 wherein the compound is 7-[2-(1-Cyclopenten-1-yl)acetamido]cephalosporanic acid.

6. A compound according to claim 1 wherein the compound is 7-[2-(2-Cyclopenten-1-yl)acetamido]cephalosporanic acid potassium salt.

7. A compound according to claim 1 wherein $R^1$ is pyridinyl.

* * * * *